US009258349B2

(12) United States Patent
Rodrigues

(10) Patent No.: US 9,258,349 B2
(45) Date of Patent: *Feb. 9, 2016

(54) METHOD AND APPARATUS OF PERFORMING REMOTE COMPUTER FILE EXCHANGE

(71) Applicant: KASEYA LIMITED, Dublin (IE)

(72) Inventor: Derek Rodrigues, Ojai, CA (US)

(73) Assignee: KASEYA LIMITED, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 14/617,193

(22) Filed: Feb. 9, 2015

(65) Prior Publication Data

US 2015/0249699 A1 Sep. 3, 2015

Related U.S. Application Data

(63) Continuation of application No. 14/304,946, filed on Jun. 15, 2014, now Pat. No. 8,954,525, which is a continuation of application No. 13/011,217, filed on Jan. 21, 2011, now Pat. No. 8,769,039.

(51) Int. Cl.
*G06F 15/16* (2006.01)
*H04L 29/06* (2006.01)
*H04L 29/08* (2006.01)
*H04L 12/851* (2013.01)

(52) U.S. Cl.
CPC .............. *H04L 65/608* (2013.01); *H04L 63/08* (2013.01); *H04L 67/06* (2013.01); *H04L 67/10* (2013.01); *H04L 67/141* (2013.01); *H04L 69/04* (2013.01); *H04L 69/24* (2013.01); *H04L 47/24* (2013.01)

(58) Field of Classification Search
CPC .................................. H04L 67/10; H04L 69/24
USPC .................................................. 709/216, 217
See application file for complete search history.

(56) References Cited

U.S. PATENT DOCUMENTS 6,331,987 B1 * 12/2001 Beser .................. H04L 12/5695
348/E7.07
7,908,401 B2 * 3/2011 Chang .................... G06F 13/385
709/220

* cited by examiner

*Primary Examiner* — Adnan Mirza

(57) ABSTRACT

Disclosed are an apparatus and method of exchanging data between a first computing device and a second computing device using a customized data transfer protocol. One example of operation may include establishing a control channel between the first computing device and the second computing device to exchange control information, negotiating a data transfer between the first and second computing devices, establishing a data channel between the first and second computing devices to transfer data, and transferring data from the first computing device to the second computing device over the data channel in parallel with control information being transferred over the control channel. The client devices may be a client and server configuration transferring data via a point-to-point data connection.

20 Claims, 7 Drawing Sheets

METHOD AND APPARATUS OF PERFORMING REMOTE COMPUTER FILE EXCHANGE

CROSS-REFERENCE TO RELATED APPLICATIONS

The instant application is a continuation of and claims priority from U.S. patent application Ser. No. 14/304,946, filed Jun. 15, 2014, entitled METHOD AND APPARATUS OF PERFORMING REMOTE COMPUTER FILE EXCHANGE, now United States Issued U.S. Pat. No. 8,954,525, issued on Feb. 10, 2015, which is a continuation of U.S. patent application Ser. No. 13/011,217, filed Jan. 21, 2011, entitled METHOD AND APPARATUS OF PERFORMING REMOTE COMPUTER FILE EXCHANGE, now United States Issued U.S. Pat. No. 8,769,039, issued on Jul. 1, 2014, the entire contents of which are incorporated by reference herein.

TECHNICAL FIELD OF THE INVENTION

This invention relates to a method and apparatus of exchanging files between at least two computers operating in a communications network, and, more particularly, to a file exchange protocol that streams data over a TCP communication channel.

BACKGROUND OF THE INVENTION

User workstations or managed machines (clients) operate in a data communication network by communicating with other managed machines and/or administrative machines (servers). Regardless of the status of the machine, administrative machines operate to support the ongoing communication and applications operating on the managed machines.

Data file transfers between a client and server computer may be performed for a variety of different purposes. The protocol or agreed communication standard used to communicate between the client and server may also vary. Before a data file can be transmitted, certain setup procedures may be necessary to ensure proper file transfer. For example, compression, encryption, bandwidth or data transfer rate, etc., are all examples of communication standards and protocol-based parameters that may be required for certain communication environments.

SUMMARY OF THE INVENTION

The present invention is directed to a method and apparatus of exchanging data. In one example, a connection is established between a client and server and data communications are performed between the client and server based on a data transfer protocol.

One embodiment of the present invention may include a method of exchanging data between a first computing device and a second computing device. The method may include establishing a control channel between the first computing device and the second computing device to exchange control information, and negotiating a data transfer between the first and second computing devices. The method may also include establishing a data channel between the first and second computing devices to transfer data, and transferring data from the first computing device to the second computing device over the data channel in parallel with control information being transferred over the control channel.

Another example embodiment of the present invention may include an apparatus configured to exchange data with a computing device. The apparatus may include a transmitter and receiver pair configured to perform various operations. The operations may include to establish a control channel with the computing device to exchange control information, negotiate a data transfer with the computing device, establish a data channel with the computing device to transfer data, and transfer data to the computing device over the data channel in parallel with control information being transferred over the control channel.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
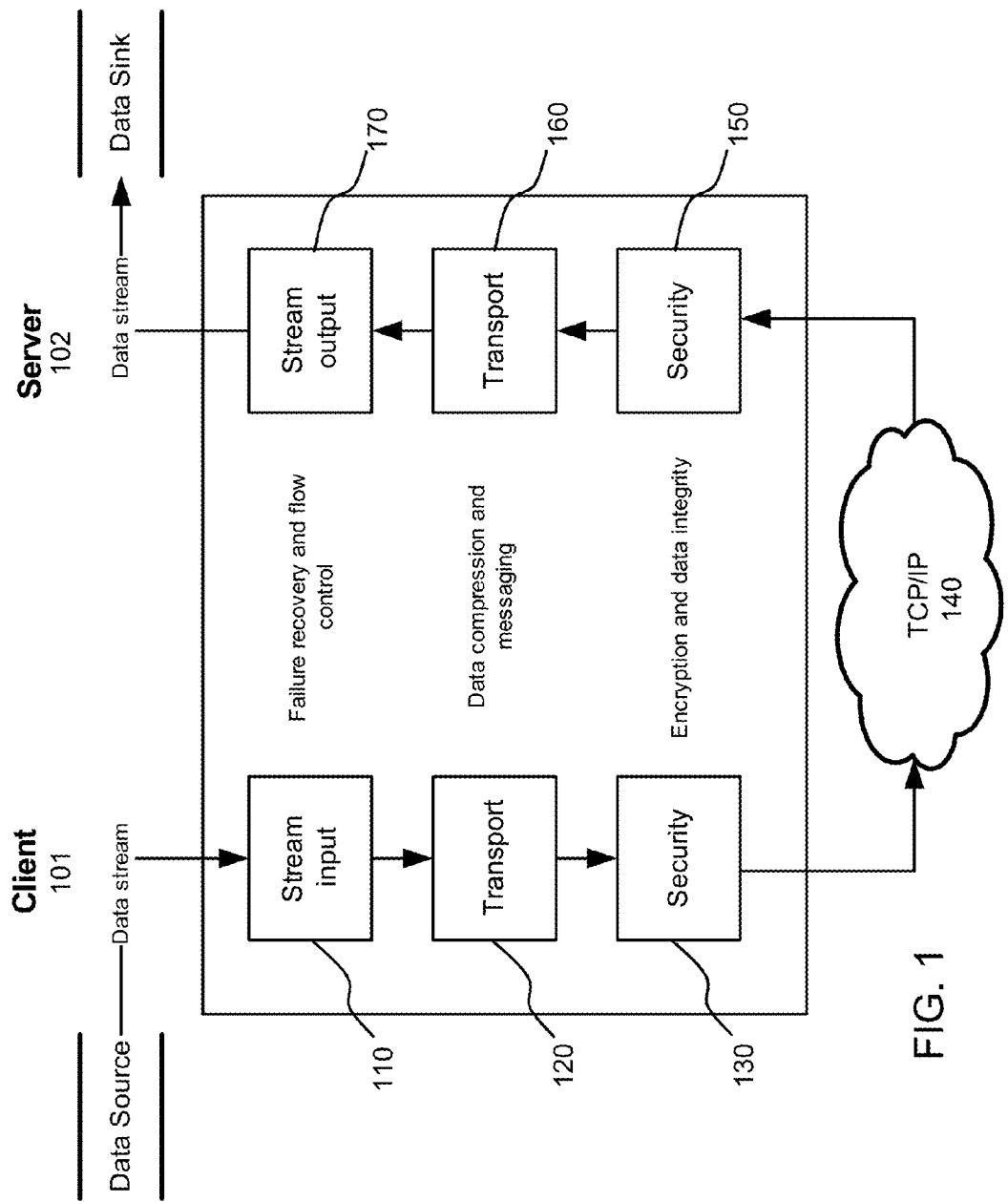
FIG. 1 illustrates an example communication flow between the client and server, according to example embodiments of the present invention.

Example embodiments of the present invention may include a method of transferring a file from one computer to another computer over a network. The described method of transfer includes optional compression and encryption, resiliency to network outages and other interruptions, and self-throttling to conserve bandwidth. According to one example of operation, a method may include a control protocol configured to negotiate the transfer of files, initiating or resuming a transfer, establishing check-points, and ending the stream of data transferred. Other example operations may include a unidirectional stream of data packets from the data source to the data sink, a bandwidth testing protocol to occasionally monitor the throughput of the channel between the endpoints. The computers may be operating on a network and may include an administrator machine and a managed machine, or, may be referred to interchangeably with a server machine 101 and client machine 102, respectively, as illustrated in FIG. 1.

A packet pair technique may be used to measure bandwidth use via a bandwidth throttling algorithm, such as, the token bucket algorithm, to throttle the stream of data to a pre-configured desired percentage of available bandwidth. Other features may include connection resiliency, for example, in the event of a network outage an attempt to re-establish the connection may be performed via a "connectionrecovery" message. In the event of an interruption (such as a network outage), the stream will resume from a last good checkpoint, rather than starting from the beginning.

Additional communication features may include authentication by using a challenge-response token. In this example, a random 4-byte integer N is generated by the client to use in an authentication challenge, and responded to by the server with N+1. The AES encryption algorithm may be used to encrypt the challenge and the response data. Additional features may include encryption, as an optional encryption of file content using the AES symmetric key algorithm or other suitable encryption. Compression may also be used as an optional compression of file contents using the "zlib" compression algorithm or other suitable encryption.

A file manager function of the administrative server may be used to transfer files from the administrator server to the managed machine or client and vice versa. One example operation to transfer a file may include using the administrator application to browse the remote file system of a managed client machine looking for a particular file of interest. In operation, the administrator selects the file and initiates a transfer of the file to a selected folder on the local file system of the administrator's machine. A command is sent by the administrator plug-in to a server process on the managed machine expecting the file transfer. The server process initiates a file stream server on the managed machine and provides it with the shared session key. A client stream writer on the administrator machine sends a start stream message with an authentication challenge. The file stream server acknowledges the start stream message with an authentication response. The client stream writer begins streaming file content to the file stream server. As it receives content, the file stream server writes the content to a specified location on the file system of the managed machine.

Additionally, periodically during the file transfer, the client stream writer application sends a "keep alive" message to the server performing the file streaming. The file server acknowledges the "keep alive" message with a checkpoint feature, such as, the total amount of data in bytes that it has successfully received at a particular point in time. The client stream writer application records this last server checkpoint, and continues streaming file content. Once all file content has been streamed, the client stream writer application sends an end stream message to the server. The server acknowledges the end of stream and the transfer is finished. The above-noted operations may be applied for files being transferred from the remote client machine 101 to the administrator server machine 102, and for multiple files being transferred in parallel.

Example embodiments of the present invention may include streaming a large volume of data between a data source and data sink over a network. The function of the data transfer protocol is to support the streaming of data between two network endpoints providing reliability, resiliency to failure, and non-disruptive network bandwidth usage. The data transfer protocol used may include a stream interface that hides the underlying protocol details from the client and server.

The protocol may also include a failure recovery capability to recover from a failure and resume a data stream at a 'last known good point.' Bandwidth management features, such as, flow control may be used to throttle the data stream rate to prevent the monopolization of network resources. Data compression may be used for compression of data before transfer over the network. Reliability "retry" and busy "back-off" features may also be used to re-establish a broken connection or wait a predetermined amount of time prior to attempting reestablishment. The data transfer protocol may also provide reliability and data integrity provided by the TCP transport layer. For example, security may be imposed by providing optional encryption used to provide privacy and integrity of data streamed over the network.

FIG. 1 illustrates the flow of the data stream between the client and server through the functional components of the data transfer protocol stack, according to example embodiments of the present invention. Referring to FIG. 1, various functional components of the data stream protocol stack are illustrated. For example, the protocol exposes a synchronous interface to the client and server that encapsulates many of the details of the underlying protocol.

The client stream interface begins at the client data source 101, which provides a way for the client 101 to place data into the data stream, and obtain information on the current state of the data stream. A data stream is always initiated by the client 101 and is uni-directional, flowing from the client 101 to the server 102, or, data sink. When a stream is initiated, the client provides a unique identifier for the stream. The server 102 uses this identifier to associate state information with the stream.

The blocks included in FIG. 1 include a stream input 110 and stream output 170 components, which provide failure recovery and flow control, a transport layer components 120 and 160, which provide data compression and messaging, and security components 130 and 150, which provide encryption and data integrity. A TCP/IP or compatible network (i.e., Internet) is illustrated as separating the client 101 from the server 102.

If a data stream transmitted between the client 101 and server 102 is interrupted for any reason (e.g. network failure) then the data transfer protocol provides the capability to the client to resume the data stream at a "last known good point", which is a checkpoint in the data stream that the data transfer protocol is able to provide a guarantee that the transferred data has been delivered to the server 102. The checkpoint is maintained by the server 102 and transferred/communicated back to the client when a broken data stream is reinitiated by the client 101.

During a communication session, if a failure occurs for a given data source and the client 101 desires to recover from the failure, then the client 101 reinitiates the data stream using the same identifier used previously, and reads the last checkpoint communicated by the server 102. The client 101 may also backtrack the data source to the last checkpoint established and continue the data stream.

Data stream state information, such as, the stream identifier and the last checkpoint is maintained by the server 102 in memory, which may also be periodically recorded into permanent storage. If the server process is terminated, then it will read the state information back into memory from permanent storage upon start-up, allowing the client 101 to resume any broken streams. State information for an inactive stream is maintained by the server for up to 72 hours before being purged.

Bandwidth management may also be performed to minimize the network footprint and avoid consuming excessive network bandwidth. The data transfer protocol manages bandwidth using a combination of both a flow control mechanism and data compression. For example, for the flow control, the data transfer protocol implements a data stream regulator. This mechanism is similar to a "leaky bucket" traffic shaping algorithm. For instance, the flow of data is constricted so as not to exceed a maximum flow rate.

When a stream is initiated by the client 101, the server 102 provides a maximum flow rate, as an upper bound of bytes per second that may be sent by the client 101 to the server 102. Since the stream interface used by the client 101 is synchronous, this allows the protocol to control the maximum rate at which the client 101 pushes data into the data stream without the use of a queue and consequently with no data loss. To increase throughput in networks with sufficient bandwidth, the server 102 may dynamically retune the client's maximum flow rate to allow more bandwidth to be consumed by the data stream. These control operations may be performed during night-time hours when network latency is low. The flow control mechanism is separate from the flow and congestion control implemented by the TCP transport layer.

Data compression streamed data is compressed by the data transfer protocol before being sent over the network. The compression level is determined by the server when the stream is initiated and may be "High", a maximize compression, "Medium", maximize performance, or "None", no compression. Although data compression reduces bandwidth usage, it may also result in improved performance in the scenario of a slow network. The data transfer protocol may also provide reliability by using TCP for its transport layer, which provides data integrity providing an ordered data transfer, error detection via a checksum, and retransmission upon error detection.

In addition, the data transfer protocol implements a connection retry mechanism. For example, when starting a new stream, if the protocol is unable to establish a connection to the server 102, it will retry every 30 seconds until it either succeeds or a predefined time interval, such as, 10 minutes has passed, after which it gives up. If attempting to re-establish a broken connection after a data stream has started, the protocol will retry every 30 seconds until it either succeeds or minutes has passed. After 10 minutes, the data transfer protocol will apply a busy "back-off" indicator that doubles the time interval between each successive failed retry (e.g. 30 s, 60 s, 120 s, 240 s, etc.). However, the data transfer protocol will give up after 2 hours. The retry intervals and timeouts are configurable on the client 101.

The data transfer protocol may use a transport layer security (TLS) protocol to encrypt all data sent over the network. Bandwidth management may be used to optimize stream flow and reduce network footprint. Stream flow rates can be configured to either minimize or maximize flow as appropriate. The use of data compression will provide some CPU overhead to both the client 101 and server 102 systems during a data stream transmission. The data compression level can be configured to disable or maximize compression as appropriate.

Various statistics may be recorded on both the client 101 and the server 102 and written to a log file. Error and trace is also recorded to a log file which can be viewed and/or mined for debugging and error reporting purposes. The data transfer protocol may include a mechanism to handle restrictive firewalls. For instance, this may include the use of TCP ports such as 80 and 443, which are the most likely ports to be open.

Figure 2:
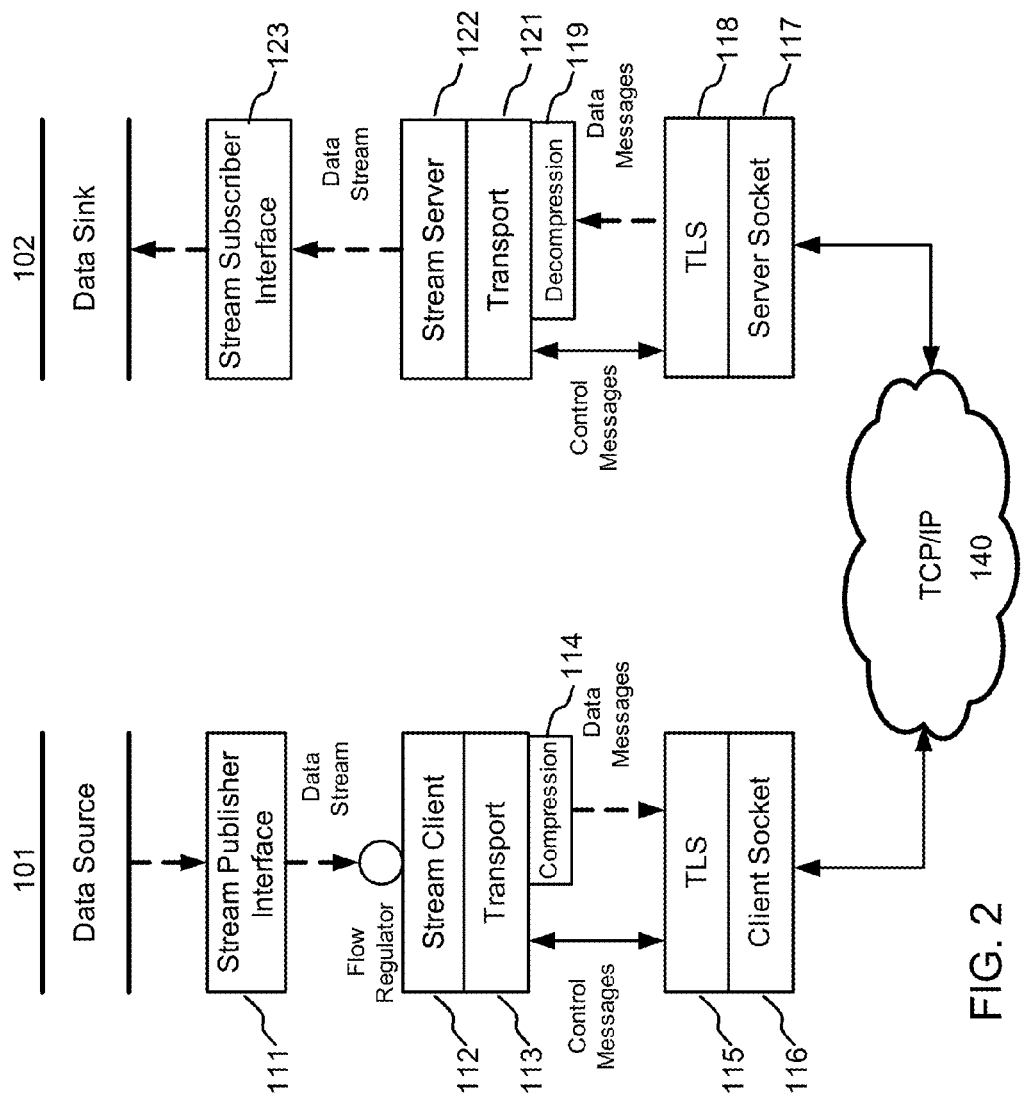
FIG. 2 illustrates another example communication flow between the client and server, according to example embodiments of the present invention.

FIG. 2 illustrates a high level flow of messages through the data transfer protocol's two communication channels, and the respective responsibilities of the subsystems at each layer of the protocol stack. Referring to FIG. 2, a data source or client 101 communicates over a stream publisher interface 111 to a flow regulator, which is coupled to the stream client 112 and transport 113 layer. Compression may be performed on data messages 114 and forwarded to a TLS layer 115 of a client socket 116 coupled to a TCP/IP network 140.

Referring again to FIG. 2, the data flow towards the data sink or server 102 may include a server socket 117 couple to the TLS layer 118, which communicates control messages to a transport layer 121. Decompression of the compressed data may be performed as part of the transport layer functions 119. The stream server 122 may provide a data stream function to stream data to the stream subscriber interface 123 of the data sink server 102.

As illustrated in FIG. 2, the data transfer protocol includes two communication channels, which may be sent over the same underlying TCP connection. This may include a data stream channel that provides a unidirectional stream of messages flowing from the client 101 to the server 102. The data messages include the application data being streamed from the data source 101. The application data may be compressed before being transmitted.

Figure 5A:
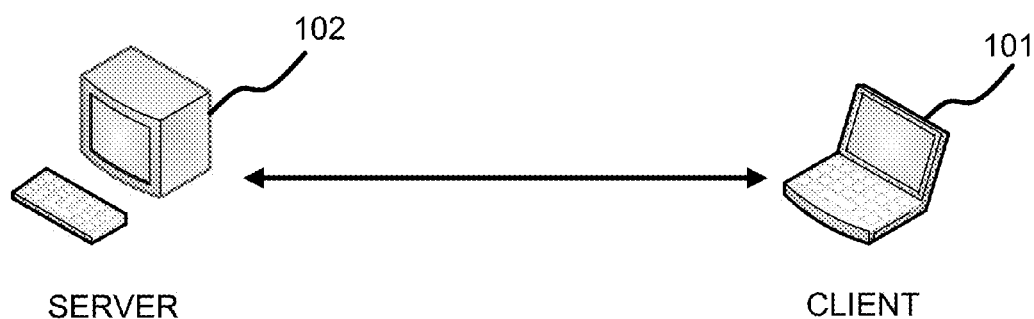
FIGS. 5A and 5B illustrate example communication paths established between the client and server, according to example embodiments of the present invention.
Figure 5B:
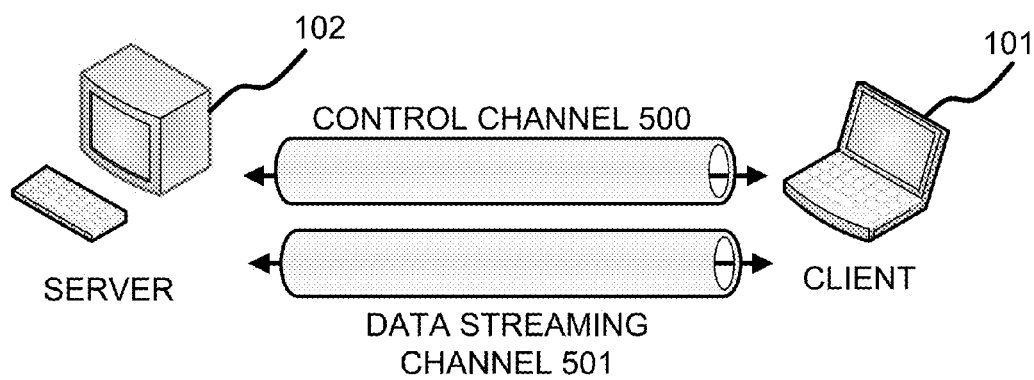

Referring to FIG. 5A, initial communications may be transferred to and from the client 101 and server respectively. However, prior to streaming data communications, a control channel 500 may be established to include out-of-band control messages being exchanged between the client 101 and server 102 to initiate, maintain, and terminate the data stream of the data streaming channel 501 (see FIG. 5B). The messages used by the data transfer protocol are described in further detail below.

Figure 3:
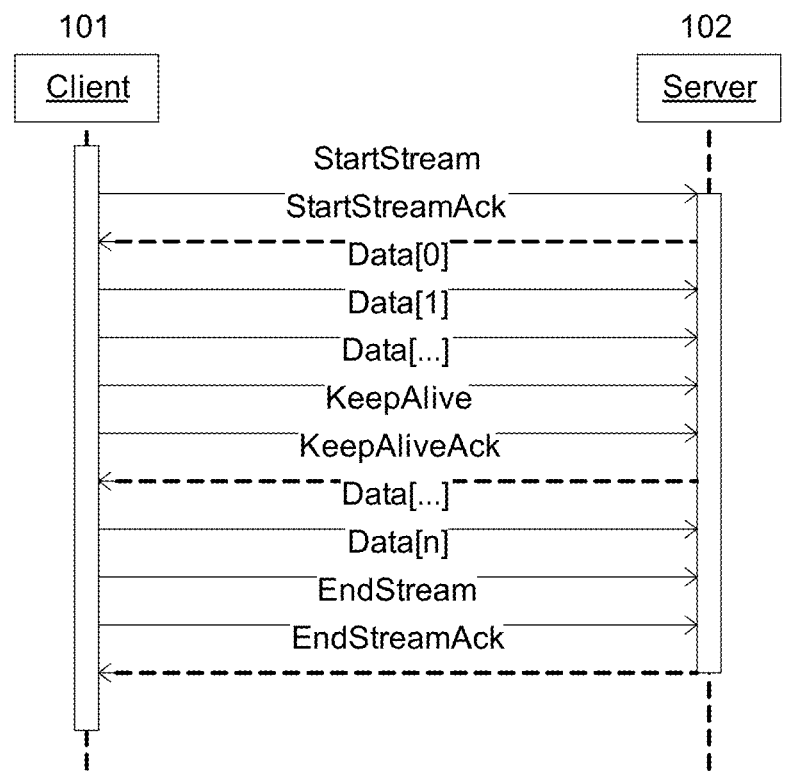
FIG. 3 illustrates an example communication signaling diagram between the client and server, according to example embodiments of the present invention.

A typical message flow sequence for a data stream between a client 101 and server 102 is illustrated in FIG. 3. Referring to FIG. 3, a "StartStream" message is sent by the client 101 to initiate a new stream or resume an existing stream. The message includes information, such as, a "StreamIdentifier", which is a unique identifier string selected by the client 101 to label the stream. A "StartStreamAck" may then be returned to the client 101 by the server 102 in response to the "StartStream" message. This message may contain certain attributes, such as, a compression level, which may be an unsigned short compression level that should be used by the client, such as, "0"—no compression, "1"—use compression to maximize performance, or use compression, to maximize compression. Other attributes may include "sendRateBytes- PerSec", which is an unsigned integer used to maximum data flow rate that should be used by the client 101. Another attribute may be "lastServerCheckpointBytes", which is an unsigned int64 that indicates >"0"—if the server finds an existing broken stream with a matching "streamIdentifier", which may be expressed as the byte position in the stream. Or, "0" otherwise.

Data messages sent by the client 101 may contain certain attributes, such as, "dataChecksum", which is an unsigned integer, "dataLengthBytes", which is an unsigned integer used to indicate the length of the data payload that immediately follows the message, and "dataCompressionLevel", which is an unsigned short variable used to indicate the compression level of the data payload.

Referring again to FIG. 3, when no server acknowledgment is received after data has been transmitted from the client 101 to the server 102, a "KeepAlive" message may be sent by the client every 2 minutes as a heartbeat signal and to request updated compression and transmission rate data. This message may contains no attributes. As a result, the server 102 may return a "KeepAliveAck" as a response to the "KeepAlive." This message contains certain attributes, such as, "compressionLevel" (unsigned short) "sendRateBytesPerSec" (unsigned integer), "lastServerCheckpointBytes" (unsigned integer64), "EndStream", sent by the client to end a stream. Upon receiving an "EndStream" message, the server considers the stream closed, removes the "streamIdentifier" from its table, sends an "EndStreamAck", and then drops the client connection. The client 101 waits for an acknowledgment from the server before dropping its connection.

The server 102 response to an "EndStream" message may include the attributes "lastServerCheckpointBytes" (unsigned integer64) as the final (total) length of the data stream. The client 101 may use the "lastServerCheckpointBytes" value to verify that the stream has been completely transferred. Data messages may be serialized using the JSON (JavaScript Object Notation) format. This format is used because it is text-based making it easily human readable, and, extensible, which many open-source C/C++ implementations accommodate. The binary format of data messages may include 3 parts as illustrated in FIG. 4.

Figure 4:
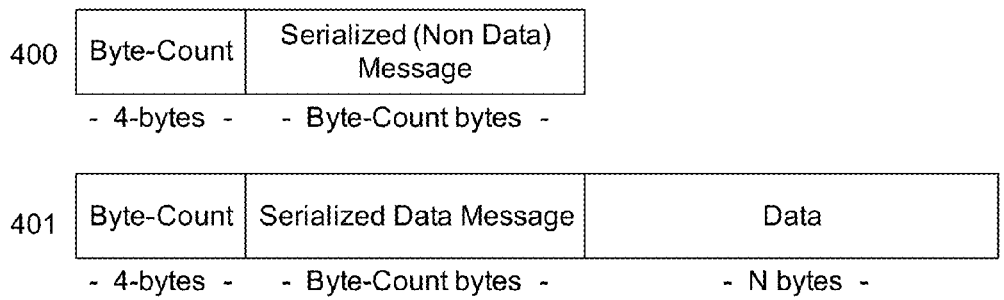
FIG. 4 illustrates an example data packet message used in the communication signaling, according to example embodiments of the present invention.

Referring to FIG. 4, the byte count of packet message 400 is a 4-byte value indicating the length of the serialized message part, the serialized message is part of the JSON formatted message and may include no data for a non-data message. For data packet 401, the data may include a serialized data message and an optional binary content for the data portion of "N" bytes. The binary content is appended to rather than included as an attribute of the JSON serialized message since JSON does not provide good support for large binary content and the absence of any formatting or delimiters will improve server performance during deserialization.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 101, 102, etc.

Figure 6:
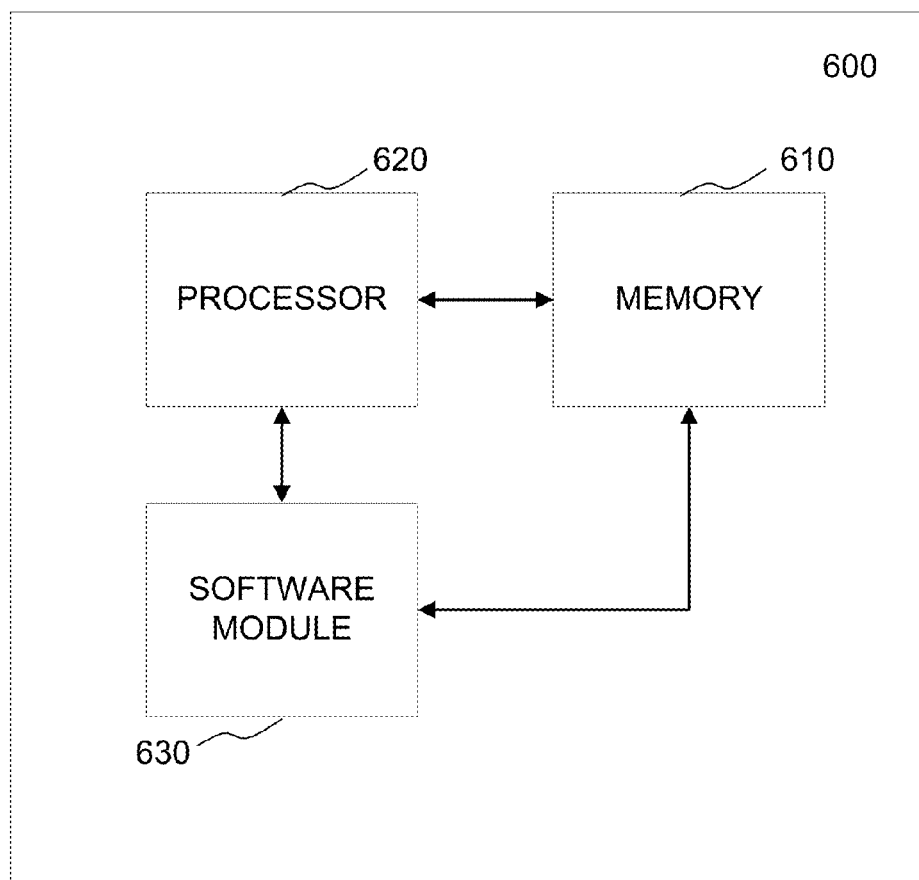
FIG. 6 illustrates an example network entity device configured to store instructions, software, and corresponding hardware for executing the same, according to example embodiments of the present invention.
Figure 7:
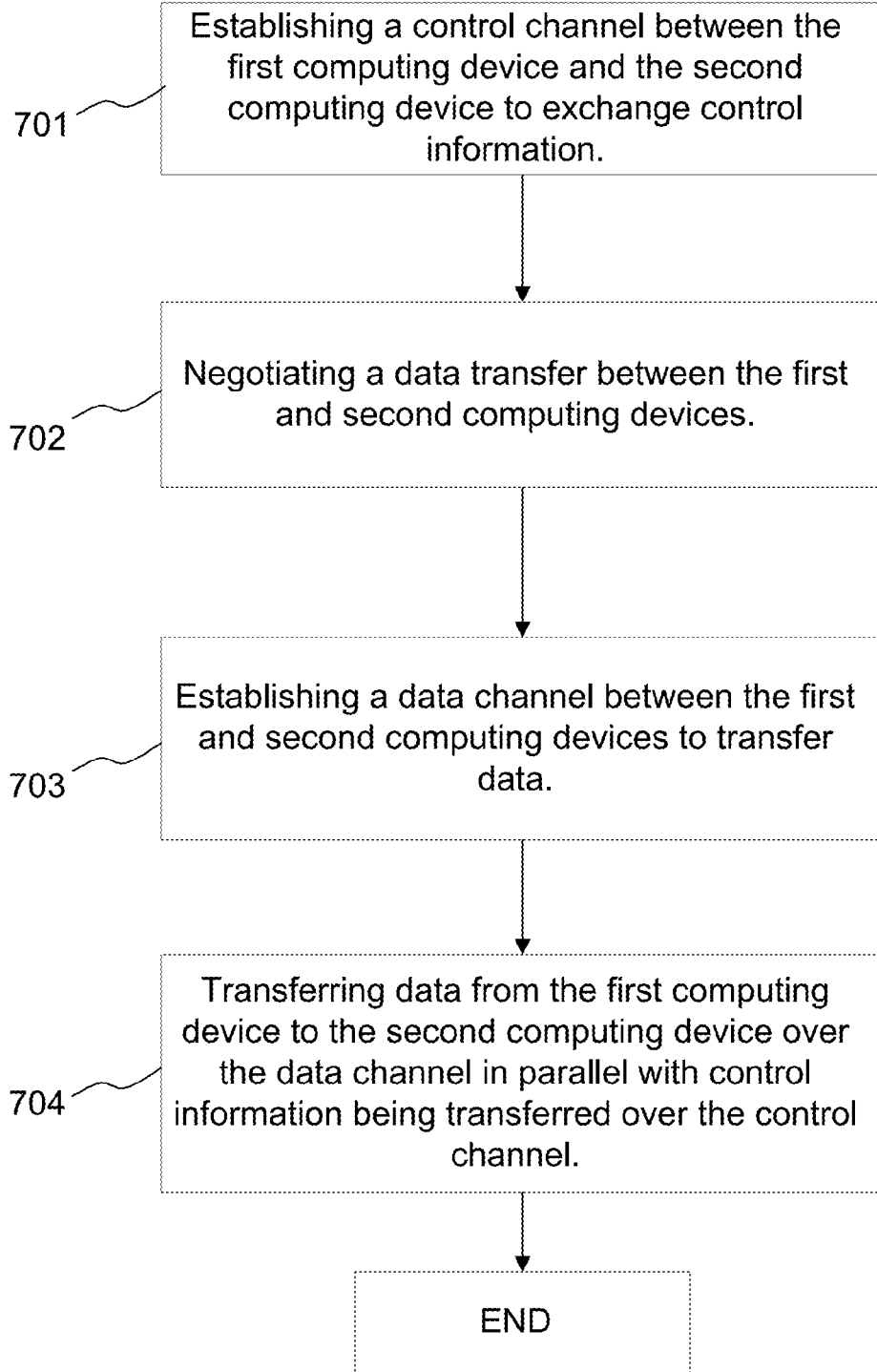
FIG. 7 illustrates an example method flow diagram, according to example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

One example method of operation according to example embodiments of the present invention may include a method of exchanging data between a first computing device and a second computing device. The method may include establishing a control channel between the first computing device and the second computing device to exchange control information, at operation 701, and negotiating a data transfer between the first and second computing devices, at operation 702. Other operations may include establishing a data channel between the first and second computing devices to transfer data, at operation 703 and transferring data from the first computing device to the second computing device over the data channel in parallel with control information being transferred over the control channel, at operation 704.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:

establishing a control channel between a first computing device and a second computing device to exchange control information comprising streaming data initiation information regarding when streaming data should initiate, and streaming data termination information regarding when the streaming data should terminate, wherein the control information further comprises at least one of a proposed data rate and a proposed data compression level to be used during the data exchange between the first computing device and the second computing device;

negotiating a data transfer between the first computing device and the second computing device; and transferring the data from the first computing device to the second computing device over a data channel in parallel with the control information being transferred over the control channel.

2. The method of claim 1, wherein the first computing device is a client device and the second computing device is a server device, and wherein transferring data from the client device to the server device is performed uni-directionally over the data channel.

3. The method of claim 1, wherein the control channel is separate from the data transfer channel.

4. The method of claim 1, further comprising negotiating a data transfer between the first and second computing devices, wherein negotiating the data transfer further comprises negotiating at least one of resuming a data transfer and establishing checkpoints during the data transfer.

5. The method of claim 2, wherein the data transfer between the client device and the server device is a point-to-point data transfer.

6. The method of claim 1, wherein in the event of an interruption the data will resume transferring data at a last known good checkpoint based on at least one established checkpoint performed during the data transfer.

7. The method of claim 2, further comprising:
authenticating the data transfer via a random 4-byte integer N generated by the client device to use in an authentication challenge; and
receiving a response by the server with an integer N+1.

8. An apparatus, comprising:
a transmitter and receiver pair configured to:
establish a control channel with a computing device to exchange control information regarding when data being streamed should initiate, and information regarding when the data being streamed should terminate, wherein the control information further comprises at least one of a proposed data rate and a proposed data compression level to be used during the data exchange;
negotiate a data transfer between the first computing device and the second computing device; and
transfer the data to the computing device over a data channel in parallel with control information being transferred over the control channel.

9. The apparatus of claim 8, wherein the apparatus is a client device and the computing device is a server device, and wherein transferring data from the client device to the server device is performed uni-directionally over the data channel.

10. The apparatus of claim 8, wherein the control channel is separate from the data transfer channel.

11. The apparatus of claim 8, further comprising a negotiation of data transfer with the computing device, wherein the negotiation of the data transfer further comprises the negotiation of at least one of a data transfer being resumed and checkpoints being established during the data transfer.

12. The apparatus of claim 9, wherein the data transfer between the client device and the server device is a point-to-point data transfer.

13. The apparatus of claim 8, wherein in the event of an interruption the data will resume the data transfer at a last known good checkpoint based on at least one established checkpoint performed during the data transfer.

14. The apparatus of claim 9, further comprising:
a processor configured to perform authentication of the data transfer via a random 4-byte integer N generated by the client device to use in an authentication challenge, and wherein the receiver is configured to receive a response by the server with an integer N+1.

15. A non-transitory computer readable storage medium comprising instructions that when executed cause a processor to perform:
establishing a control channel between a first computing device and a second computing device to exchange control information comprising streaming data initiation information regarding when streaming data should initiate, and streaming data termination information regarding when the streaming data should terminate, wherein the control information further comprises at least one of a proposed data rate and a proposed data compression level to be used during the data exchange between the first computing device and the second computing device;
negotiating a data transfer between the first computing device and the second computing device; and
transferring the data from the first computing device to the second computing device over a data channel in parallel with control information being transferred over the control channel.

16. The non-transitory computer readable storage medium of claim 15, wherein the first computing device is a client device and the second computing device is a server device, and wherein transferring data from the client device to the server device is performed uni-directionally over the data channel.

17. The non-transitory computer readable storage medium of claim 15, wherein the control channel is separate from the data transfer channel.

18. The non-transitory computer readable storage medium of claim 15, further comprising negotiating a data transfer between the first and second computing devices, wherein negotiating the data transfer further comprises negotiating at least one of resuming a data transfer and establishing checkpoints during the data transfer.

19. The non-transitory computer readable storage medium of claim 16, wherein the data transfer between the client device and the server device is a point-to-point data transfer.

20. The non-transitory computer readable storage medium of claim 15, wherein in the event of an interruption the data will resume transferring data at a last known good checkpoint based on at least one established checkpoint performed during the data transfer.

* * * * *